(12) United States Patent
Morriss et al.

(10) Patent No.: US 9,128,811 B2
(45) Date of Patent: Sep. 8, 2015

(54) ASSIGNING ADDRESSES TO DEVICES ON AN INTERCONNECT

(75) Inventors: Jeff Morriss, Cornelius, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 13/532,978

(22) Filed: Jun. 26, 2012

(65) Prior Publication Data

US 2013/0346635 A1 Dec. 26, 2013

(51) Int. Cl.
*G06F 9/50* (2006.01)
*G06F 13/00* (2006.01)
*G06F 21/44* (2013.01)

(52) U.S. Cl.
CPC ............. *G06F 13/00* (2013.01); *G06F 9/5027* (2013.01); *G06F 21/445* (2013.01); *G06F 9/5011* (2013.01); *G06F 2213/0052* (2013.01)

(58) Field of Classification Search
CPC ... G06F 21/445; G06F 9/5011; G06F 9/5027; G06F 2213/0052
USPC ............................................................ 710/5
See application file for complete search history.

(56) References Cited

U.S. PATENT DOCUMENTS

| | | | |
|---|---|---|---|
| 6,009,488 A | 12/1999 | Kavipurapu | |
| 7,769,883 B2 | 8/2010 | Harriman et al. | |
| 7,936,706 B2 * | 5/2011 | Wood, Jr. | 370/312 |
| 7,949,794 B2 | 5/2011 | Ajanovic et al. | |
| 2004/0164708 A1 * | 8/2004 | Veselic et al. | 320/132 |
| 2006/0023633 A1 | 2/2006 | Caruk et al. | |
| 2006/0111168 A1 * | 5/2006 | Nguyen et al. | 463/16 |
| 2006/0184809 A1 | 8/2006 | Kojou et al. | |
| 2007/0095928 A1 * | 5/2007 | Balinsky et al. | 235/492 |
| 2008/0233912 A1 | 9/2008 | Hunsaker et al. | |
| 2008/0235528 A1 | 9/2008 | Kim et al. | |
| 2009/0129595 A1 | 5/2009 | Stam | |
| 2009/0282256 A1 | 11/2009 | Rakic et al. | |
| 2010/0007513 A1 | 1/2010 | Horky et al. | |
| 2010/0014541 A1 | 1/2010 | Harriman et al. | |
| 2010/0081406 A1 | 4/2010 | Tan | |
| 2010/0332868 A1 | 12/2010 | Tan et al. | |
| 2011/0060931 A1 | 3/2011 | Radhakrishnan et al. | |
| 2011/0196990 A1 * | 8/2011 | Govindaraju et al. | 710/9 |
| 2012/0102334 A1 | 4/2012 | O'Loughlin et al. | |

OTHER PUBLICATIONS

U.S. Appl. No. 13/477,310 entitled, "Optimized Link Training and Management Mechanism," filed May 22, 2012, by Mahesh Wagh, et al.

(Continued)

*Primary Examiner* — Henry Tsai
*Assistant Examiner* — John Roche
(74) *Attorney, Agent, or Firm* — Trop, Pruner & Hu, P.C.

(57) ABSTRACT

In one embodiment, the present invention includes an apparatus having a random number generator to generate a random number responsive to a first command from a host controller and a logic to generate a device identifier for the apparatus. The apparatus can provide a reply to the host controller including the random number responsive to an identification request from the host controller corresponding to the device identifier. Other embodiments are described and claimed.

14 Claims, 8 Drawing Sheets

(56) References Cited

OTHER PUBLICATIONS

U.S. Appl. No. 13/477,304 entitled, "Providing a Consolidated Sideband Communication Channel Between Devices," filed May 22, 2012, by David Harriman, et al.
U.S. Appl. No. 13/477,322 entitled, "Providing a Load/Store Communication Protocol With a Low Power Physical Unit" filed May 22, 2012, by Sridharan Ranganathan, et al.
International Searching Authority, "Notification of Transmittal of the International Search Report and the Written Opinion of the International Searching Authority," mailed Oct. 16, 2013, in International application No. PCT/US2013/046452.
Taiwan Patent Office, Taiwanese Office Action mailed Apr. 21, 2015, in Taiwanese Patent Application No. 102135101. (Redacted).

* cited by examiner

ASSIGNING ADDRESSES TO DEVICES ON AN INTERCONNECT

BACKGROUND

To enable devices coupled to an interconnect such as a universal serial bus (USB) interconnect to communicate, an enumeration process first occurs to identify one or more devices connected to the interconnect. This process is typically implemented by a host controller connected to the bus. Current enumeration methods have complexity in that they often require a priori knowledge by the host controller of the connected devices, have predetermined requirements such as geographical addressing, or require additional communications such as separate chip select signals. As such, current enumeration methods may not be suitable in all situations. Also another issue with current methods is that in some cases the deficiency is in added cost due to more circuits, pins, complexity and so forth, to perform enumeration methods.

DETAILED DESCRIPTION

Assigning unique addresses to devices connected to a multi-drop bus may be a prerequisite for establishing useful communications among the devices. Consider the case of a host controller (HC) acting as a master coupled to multiple devices, where each device is to be assigned a unique address. Embodiments may provide for address assignment of devices coupled to an interconnect, without geographical addressing or other types of hard coded addresses, although such techniques are possible. In some embodiments, a mixed environment can be used along with either or both of those address techniques.

In one embodiment, devices coupled to a HC, under command from the HC, can generate addresses based on a random number generated by each device as a means of disambiguation. The random number can be set to be sufficiently large such that the probability of two devices generating the same number is very low. For example in some embodiments this random number may be on the order of between approximately 12 and 32 bits, assuming a system in which less than approximately 16 devices can couple to the same interconnect.

In an embodiment, the interconnect described is a Low Power Serial (LPS) interconnect, which is a serial multi-drop bus that can be used to primarily couple devices within a system to a main processor such as an SoC, also referred to as an in-box IO situation. This interconnect may provide support for existing software models such as USB. Each device coupled to this interconnect can be configured with a unique address, referred to as a device identifier (ID), or simply an ID. It is permitted that these IDs are statically assigned, and although an assignment technique described herein applies to dynamic assignment, even devices with statically assigned IDs may be configured to comprehend the protocol.

Each device coupled to the interconnect may have a storage such as an ID register to store a number at least as large as the maximum number of devices on the interconnect. For purposes of discussion assume that the maximum number of devices is 16 or less, allowing a 4-bit device ID. In addition, each device can be configured to generate a number of a predetermined length that is essentially random, or at least uncorrelated with respect to corresponding random numbers generated by other devices.

Figure 1:
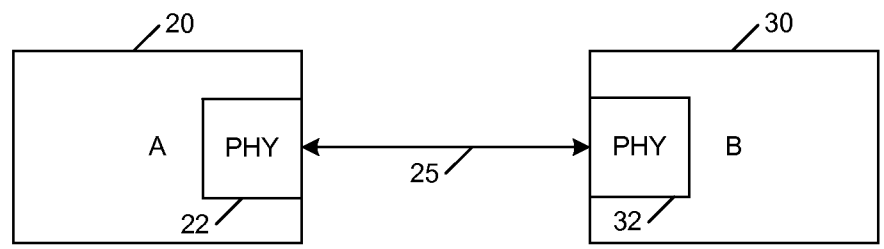
FIG. 1 is a block diagram of a pair of devices coupled via an interconnect in accordance with an embodiment of the present invention.

Referring now to FIG. 1, shown is a block diagram of a pair of devices coupled via an interconnect in accordance with an embodiment of the present invention. As shown in FIG. 1, system 10 includes a first device 20 coupled to a second device 30 via an interconnect 25. In an embodiment, first device 20 may correspond to a main processor of a system such as a system-on-a-chip (SoC), while second device 30 may be a peripheral device such as one of multiple sensors or other low data rate devices.

In the embodiment of FIG. 1, interconnect 25 may be a low power serial (LPS) interconnect having a protocol that will be described further herein. In various embodiments, this interconnect may be of a relatively low overhead and reduced complexity protocol to enable operation at low power, e.g., at a level much less than other serial interconnects such as a universal serial bus (USB) interconnect. Embodiments may be appropriate for general-purpose low or mid-performance communications, such as providing of sensor data, configuration information, or so forth at data rates of less than approximately 1 gigabits per second (Gbps) for point-to-point or appropriately terminated connections, and in the range of between approximately 10-100 Mbps for unterminated connections. In other embodiments, this type of interconnect may be used as a sideband mechanism to provide sideband management of a separate link.

As further seen in FIG. 1, each device may include a physical unit (PHY) to provide for encoding and handling of transmission/reception via interconnect 25. As seen, first device 20 may include a PHY 22 and second device 30 may include a PHY 32.

To provide for communication at low power, embodiments may provide a wire protocol of relatively reduced complexity. This protocol may have various elements including: providing of bus idles between packets, even if the same master communicates multiple packets (thus simplifying receiver complexity); a preamble for purposes of bit locking; a postamble at a transmission end to provide for returning to an idle state of the link to thus enable the receiver to explicitly recognize the end of a transmission without higher-level mechanisms; and providing a predetermined encoding for data communication such as an encoding according to an 8 bit/9 bit (8b/9) encoding to enable ease of identification of various information of a packet.

In an embodiment this 8b/9b encoding may be as follows: for each data byte of 8 bits, an additional start bit may be provided. This start bit may be of alternating value (e.g., zero then one). Note that in some embodiments this alternating pattern is not followed for a last byte of a data portion of the packet to mark the last byte before a postamble portion of the packet.

Figure 2:
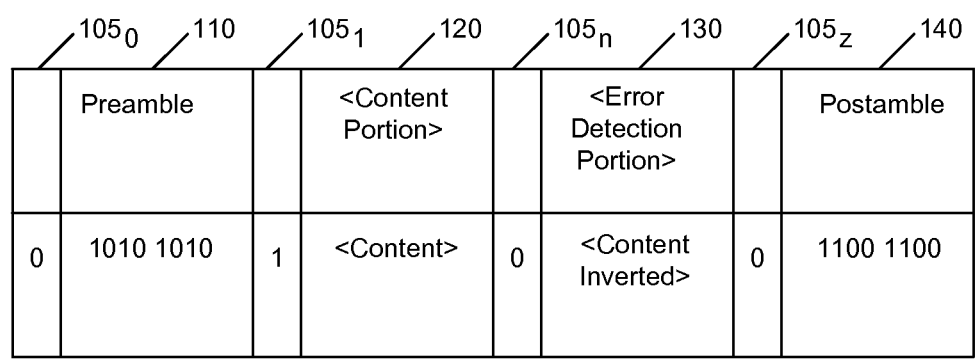
FIG. 2 is a block diagram of a packet in accordance with an embodiment of the present invention.

Referring now to FIG. 2, shown is a block diagram of a packet 100 in accordance with an embodiment of the present invention. As seen in FIG. 2, packet 100 details a protocol of a packet format for communication on a LPS interconnect. In general, packet 100 may be of a relatively limited length as a message portion of the packet can be of relatively small length, e.g., in some embodiments between approximately 1 to 64 bytes.

As seen, packet 100 can begin with a start bit $105_0$, which is one of multiple start bits $105_0$-$105_z$, each of which can be interspersed throughout the packet to thus accommodate the 8b/9b encoding of information in the packet. After this start bit, a preamble portion 110 may be provided. This preamble portion may be of a predetermined value, such as the series of alternating logic one and logic zero bits shown in FIG. 2 to thus enable a receiver to identify a beginning of the packet. This is particularly so, since using an open drain-type connection and a pull-up resistor coupled to the interconnect, potentially long periods of a logic one value may be present on the interconnect prior to transmission of a given packet.

As further seen in FIG. 2, after preamble portion 110, a second start bit $105_1$ may be present. As seen, this start bit is of an alternating value to first start bit $105_0$. Thereafter, a content portion 120 may be provided that can be formed of a length that may be predetermined (or can be determined based on the communication itself). In various embodiments, this content portion 120 may include a first initiating 8-bit block (to thus form a 9 bit block with start bit $105_1$) and one or more (and potentially zero) succeeding 9 bit blocks. In an embodiment, each of these blocks of 9 bits can be referred to as a symbol.

After the content portion 120, another start bit $105_n$ may be provided. Note that it is assumed that content portion 120 includes, in FIG. 2, an odd number of 9-bit symbols as this succeeding start bit $105_n$ is of zero value.

Thereafter, an error detection portion 130 may be provided within the packet. This error detection portion can be an inverted or one's complement version of content portion 120, and as will be described further below, can be used by the receiver for purposes of detecting an error in communication. Finally, a terminal start bit $105_z$ is provided and thereafter a postamble portion 140 occurs, which again may be of a predetermined value, such as a repeating 4 bit pattern of logic ones and zeros as seen in FIG. 2.

Although not shown for ease of illustration, understand that after communication of this packet, the interconnect may return to a logic high level until a next packet is communicated, given the open drain configuration and the pull-up resistor present and coupled to the interconnect. Also note that while shown with this particular implementation of a packet for purposes of illustration, understand that other packet types are contemplated for other embodiments. For example, different values of the preamble and postamble portions may be present. Furthermore, different alternating or other patterns for the start bits may be provided. Still further, different arrangements of the content and error detection portions may also be present in some embodiments. Note further that in some implementations, some type of scrambling of the data information may be provided for purposes of electromagnetic interference (EMI) reduction. Other possibilities exist such as providing for a defined address portion and so forth.

Note also that in various embodiments, content portion 120 may include, at a beginning portion, a unique identifier of the sender of the packet, which can be implemented via a unique address that can be statically or dynamically determined. By way of this unique identifier provided within the content portion (and thus within each packet communicated) it can be guaranteed that colliding packets will be detected, even in the case where both components start transmitting at the same time.

In some embodiments, arbitration between components coupled via such an interconnect may be performed using collision detection in which each component can attempt to transmit a packet and monitor for collisions on the interconnect. Accordingly, the PHY present in each component coupled to such an interconnect may provide for collision detection, e.g., via an open drain connection.

In some embodiments a protocol for this interconnect may provide certain parameters such as minimum idle/turnaround time between transmissions. For example in an embodiment, for an acknowledgment-type response a turnaround time of one symbol time (which as discussed above may correspond to a 9-bit portion) may occur. And for a return to an idle state, a minimum of 1 symbol time may occur.

In some embodiments, retry mechanisms may also be provided. For example, in an implementation providing for such a retry mechanism, if there is no acknowledgment received when expected, the transmitter may perform a retry transmission after a predetermined number of symbol times if it is the host or upstream device, or after a second, e.g., longer predetermined number of symbol times if it is the target or downstream device. In one such embodiment, the host-based retry mechanism may occur after between approximately 11 and 17 symbols without receipt of an expected acknowledgement, and the receiver-based retry mechanism may occur after between approximately 31 and 43 symbols without receipt of an expected acknowledgement. In other embodiments, such retry mechanisms may occur after another interval as dictated by an upper level protocol. In general, a retry timer may be set to be greater than X, where X is the expected time within an acknowledgment is to be received. Note also that the values may depend on a largest packet size. Note also that the different and non-overlapping windows in different directions may ensure that repeated collisions are avoided.

Figure 3:
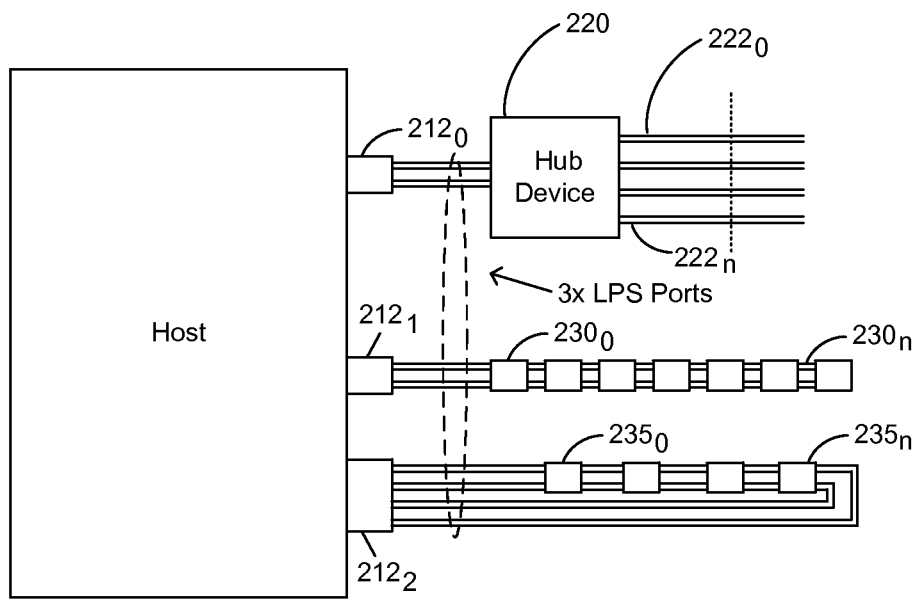
FIG. 3 is a block diagram of a connection of devices to a host controller in accordance with an embodiment of the present invention.

Referring now to FIG. 3, shown is a block diagram of a connection of devices to a host controller in accordance with an embodiment of the present invention. As shown in FIG. 3, system 200 may be part of a computing system, such as a given personal computer (PC)-based system, server system or so forth. In some embodiments, a system may be a portable device such as a laptop or notebook computer, Ultrabook™, smartphone, tablet computer or so forth. As seen, system 200 includes a host controller 210 that acts as a host for one or more LPS interconnects in accordance with an embodiment of the present invention. As shown in FIG. 3, host controller includes three LPS ports $212_0$-$212_2$. Although shown with this limited number of ports for purposes of illustration, understand the scope of the present invention is not limited in this regard. Each port may provide for communication via a link in a bidirectional manner. More specifically, the communication can be of data and clock information, e.g., bidirectional differential data and a differential clock signal.

As seen, first port $212_0$ couples to a hub device 220. In various embodiments, device 220 may be a hub device to enable conversion and interfacing between LPS host controller 210 and devices according to another interconnect protocol such as USB devices (e.g., USB2 devices). As such, hub 220 may provide, in addition to conversion of data information between the different protocols, voltage conversion, e.g., from signals having a 1.0 volt system operation via the LPS links to 3.3 volt signals for communication via USB2. As seen, hub 220 can include a plurality of ports (e.g., ports $222_0$-$222_n$) that can be provided as ports to external devices or internal devices.

Also seen in FIG. 3, second port $212_1$ of host controller 210 may provide for communication with a plurality of LPS devices $230_0$-$230_n$. These devices 230 may be of relatively low speed operation (e.g., less than approximately 100 Mbps) via a multi-drop bus having differential data and clock links. Furthermore, to provide for communications at higher speeds with higher speed devices, a separate port $212_2$ may communicate with higher speed LPS devices $235_0$-$235_n$ (in that these devices may operate at speeds greater than approximately 100 Mbps).

Note that host controller 210 may be enabled to provide for support of bridging of LPS and legacy devices for compatibility (such as USB2 devices). In an embodiment, host controller 210 may reuse a USB2 protocol stack and retain a USB programming model, while operating at a lower power level, e.g., due to voltage rails operating at a lower voltage (e.g., one volt). In this way, substantially lower active and idle power can be realized, along with a reduced pin count, as the LPS interconnect may act as a multi-drop bus.

Figure 4:
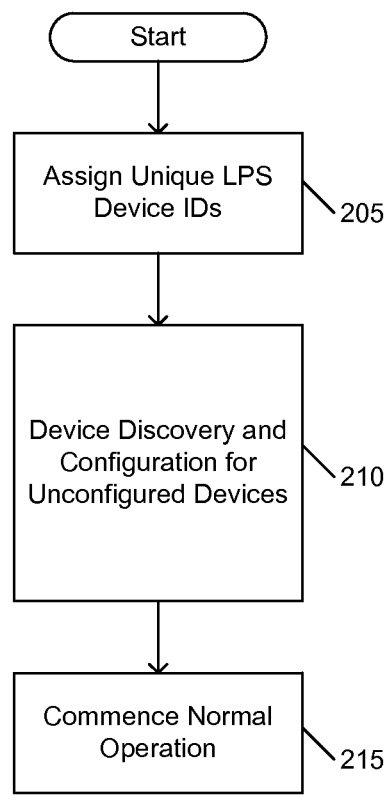
FIG. 4 is a flow diagram of a method for performing interconnect operations in accordance with an embodiment of the present invention.

Referring now to FIG. 4, shown is a flow diagram of a method for performing interconnect operations in accordance with an embodiment of the present invention. As shown in FIG. 4, method 200 may begin with an initialization process including blocks 205 and 210. During such operations, the interconnect may operate in a single-ended open drain signaling mode to ensure that collisions are detected. And, during the enumeration phase all devices operate at a data rate sufficiently slow so that open drain signaling will work (e.g., less than approximately 1 megabit per second (Mbit/s)) and may guarantee that data collisions will be detected. Such initialization operations can be performed after a reset, unless state information has been specifically saved. That is, these initialization operations can be performed when one or more devices coupled to the interconnect do not have a non-volatile storage or do not save their state information prior to entry into a low power or powered off state. In addition, such initialization operations may be performed at runtime as needed, e.g., to support power gated devices.

Specifically, at block 205 an enumeration phase is performed in which unique device identifiers (device IDs) can be assigned to each of the devices coupled to the interconnect. Note that the device ID assignment may be independent of protocol-configuration operations. That is, one or more devices coupled to the interconnect can have a device ID modified without disrupting other configured devices. Details of an address assignment process will be discussed further below.

Next at block 210, device discovery and configuration can be performed for devices that were not previously configured. Such discovery and configuration processes may include determination of device type, manufacturer, model, resource requirements, association to specific driver software, and assignment of resources such as addresses, interrupt vectors, and so forth. After such initialization operations, control passes to block 215 where normal operations may commence.

Note that for active transmissions, non-open drain signaling may occur with a switch in idle mode to allow an interrupt mechanism. Thus the bus is parked to idle in some state where typically just one device is allowed to drive the bus. However, any device can request service via this circuit mechanism to enable any device to indicate a request for service, which would typically be followed by some type of query or polling mechanism to determine the source of the request for service.

In some embodiments there may be certain fundamental assumptions, specifically: devices without pre-established unique IDs can implement a random number generator; bus collisions corrupt data in a consistent detectable way, but are non-damaging; and the ID space is small (e.g., 4 bits).

In an embodiment, an address allocation protocol may include the following commands:

ID_Poll command in which addressed device(s) respond with the device's stored random number (note that the device ID is implied by the response), followed by that number's complement;

Change_Random in which all devices without locked addresses (see below, ID_Lock) regenerate their random numbers;

ID_Lock command in which an addressed device ignores subsequent Change_Random commands until a reset occurs; and ID_Complete in which devices are notified that the address assignment process has completed.

In general, enumeration begins with the HC issuing an ID_POLL command to which each device decodes and responds. The ID_POLL packet contains a packet identifier and an ID. Devices respond in one of three possible ways: 1) if the ID in the packet matches none of the ID's in the devices nothing is returned; 2) if exactly one device matches it returns its random number followed by the ones complement thereof, such that HC will determine that the random number and its complement are consistent (e.g., such that a sum or an exclusive OR of the values equals a predetermined number); and 3) if two or more devices match an ID of an ID_POLL command, each will return their respective random numbers and their complements, with the result that, since the two random numbers differ, there will be a data corruption. By having the device return its random number and complement, it is possible for the HC to determine that one and exactly one device is responding when a consistent data portion and error detection portion occur. Note that the device's random number can be configured to map to its ID. In an embodiment, a device may implement a predetermined random number if (and only if) it can be known a priori that this number will not conflict with any other device and/or that only some part of the number may actually be random. With a sufficiently large random number the probability of detecting a corruption between the random number and its complement (due to data collisions) approaches unity.

This polling process may occur as the HC walks through its entire ID field, determining which devices have unique ID's and which ones share an ID. To all those devices that have a unique ID, the HC issues an ID_LOCK command, which contains the ID value to be locked. This command locks the ID for the corresponding device (and also its random number generator) so that subsequent re-randomization commands have no effect. All devices having an ID that has not been locked may be configured to invalidate the address value in the command, to prevent such devices from mapping to an ID that has already been selected.

Next, the HC issues a CHANGE_RANDOM command to which only those devices whose ID is not locked respond.

This command may cause the affected devices to regenerate their random numbers which in turn cause generation of new ID mappings.

The host controller may repeat the above operations until each device has a unique ID. Once the ID assignment phase is complete the random number generator circuits may be disabled to save power.

Figure 5:
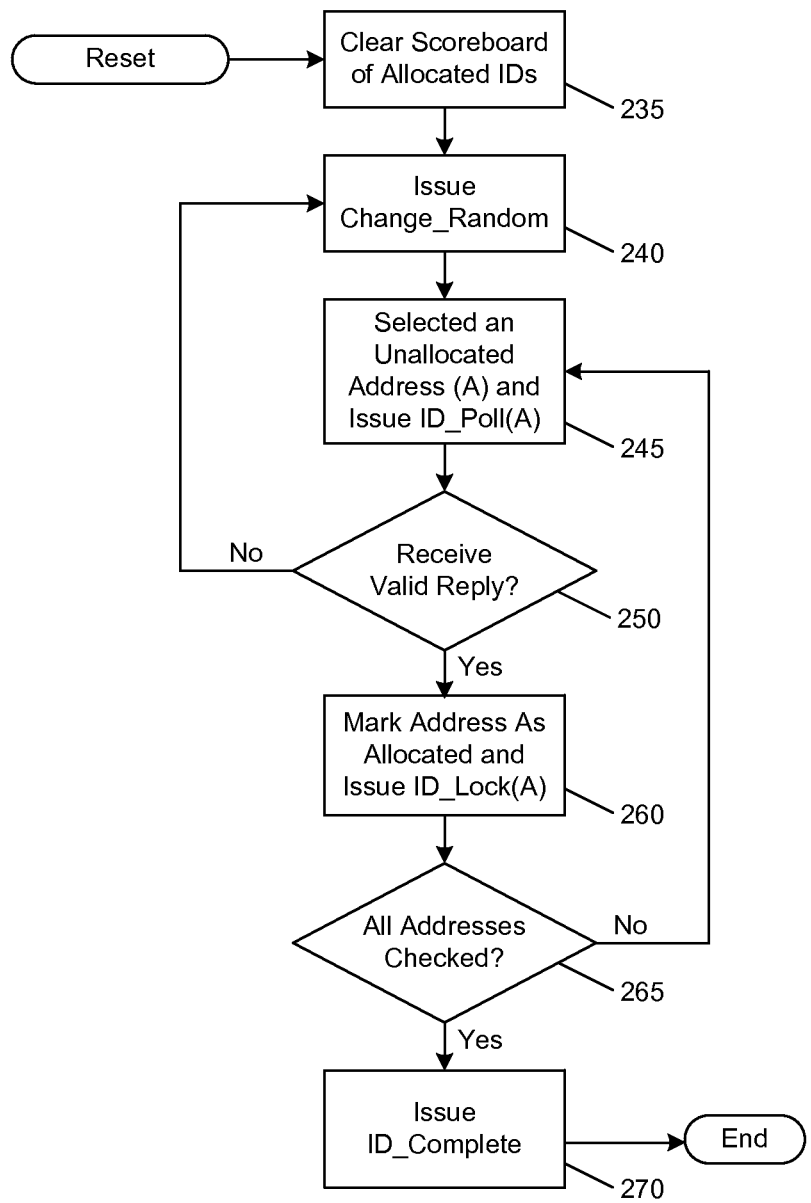
FIG. 5 is a flow diagram of a method for performing ID assignment in accordance with an embodiment of the present invention, from the view of a host controller.

Referring now to FIG. 5, shown is a flow diagram of a method for performing ID assignment in accordance with an embodiment of the present invention, from the view of a host controller.

As seen, method 230 may begin responsive to a reset. Here, a scoreboard (which may be in the host controller or may be implemented through a higher level mechanism (e.g., in a system software)) may be cleared of all allocated IDs. Note that this scoreboard may be a non-volatile or other storage to store an indication of the devices coupled to the interconnect and their corresponding device IDs.

Still referring to FIG. 5, next the host controller may issue a first command, namely a Change_Random command (block 240). This command causes devices having unallocated IDs to regenerate a new random number and device ID.

Control next passes to block 245 where an unallocated address (A) can be selected and the host controller can issue a second command, namely an ID_Poll (A) command, to thus request a reply from any devices having this address A. Next control passes to diamond 250 where it can be determined whether any valid replies are received from a device within a predetermined time. This determination can be based on whether a correct reply is received within a predetermined interval, which in an embodiment can be on the order between approximately 1 and 20 symbols. If not, control passes back to block 240 for issuance of another Change Random command.

If a valid reply is received, control passes to block 260 where the address may thus be allocated and marked as allocated, and a third command, namely an ID_Lock (A) command, can be sent to thus cause the correctly responding device to lock the address to the device. Note that marking of the allocated address may be in the scoreboard. Control next passes to diamond 265 where it can be determined whether all addresses have been checked. If not, control passes back to block 245 above. Otherwise, control passes to block 270 where a fourth command, namely an ID_Complete command, may be issued to thus indicate to the devices that the address allocation process is completed.

Figure 6:
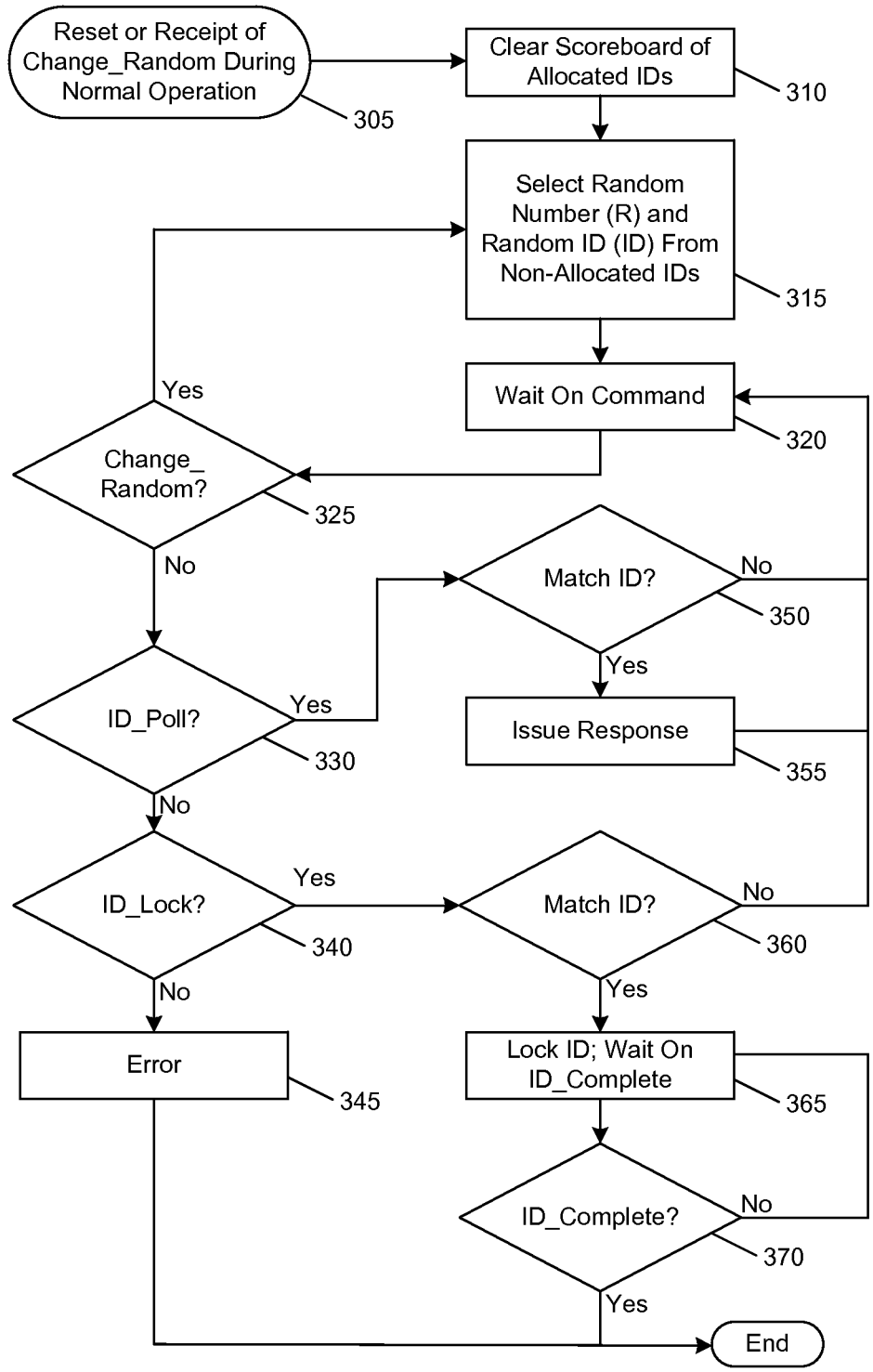
FIG. 6 is a flow diagram of a method for performing a device ID assignment from a view of a device not having a pre-determined device ID in accordance with one embodiment of the present invention.

Referring now to FIG. 6, shown is a flow diagram of a method for performing a device ID assignment from a view of a device not having a pre-determined device ID. As seen, method 300 may begin at reset or receipt of a Change_Random command during normal operation (block 305). Control next passes to block 310 where a scoreboard can be cleared of all allocated IDs. Note that this scoreboard may be included in or associated with the device. Control next passes to block 315, where a random number (R) and a random identifier (namely an identifier that acts as a device ID) can be selected from non-allocated device IDs. In this initial flow, there are no allocated IDs to the knowledge at the device, as the scoreboard has just been cleared.

Next control passes to block 320 where the device waits on a command. If the received command is a Change_Random command, as determined at diamond 325, control passes back to block 315, above. Otherwise, control passes to diamond 330 to determine whether it is an ID_Poll command. If so, control passes to diamond 350 to determine whether the address associated with this ID_Poll command matches the device ID (namely the randomly generated ID). If not, control passes to block 320 above. If the addresses match, control passes to block 355 where the device may issue a response back a host controller. As discussed above, this response may indicate, in a data portion of the reply the new random number (R), and the corresponding complement of this information may be included in the error detection portion of the reply. Thus control passes again to the above block 320.

If the received message is instead an ID_Lock message, as determined at diamond 340, control passes to diamond 360 to determine whether the address associated with the ID_Lock request matches the random ID. If so, control passes to block 365 where the device may lock its ID to this random ID value and then the device may wait for the address allocation process to complete via an ID_Complete command, which when received at diamond 370 causes the method to conclude. Note that in an embodiment the ID_Lock command may cause the device to store its random ID and random number, both in an address register of the device as well as in corresponding entry for the device in the scoreboard. Note that if an error occurs, control passes to block 345 where the method may be completed. Although shown at this high level in the embodiment of FIG. 6, understand the scope of the present invention is not limited in this regard.

Thus embodiments do not require any a priori knowledge by the HC, geographical addressing, or the need for separate chip select signals. Furthermore, embodiments can be insensitive to the number of devices being enumerated and can perform discovery either at power-up or when an additional device is powered-on, thus supporting plug and play without selectively enabling and disabling ports. In a multi-crop configuration, the interconnect may appear like a USB interconnect to higher protocol levels, in part due to the address allocation described herein.

Figure 7:
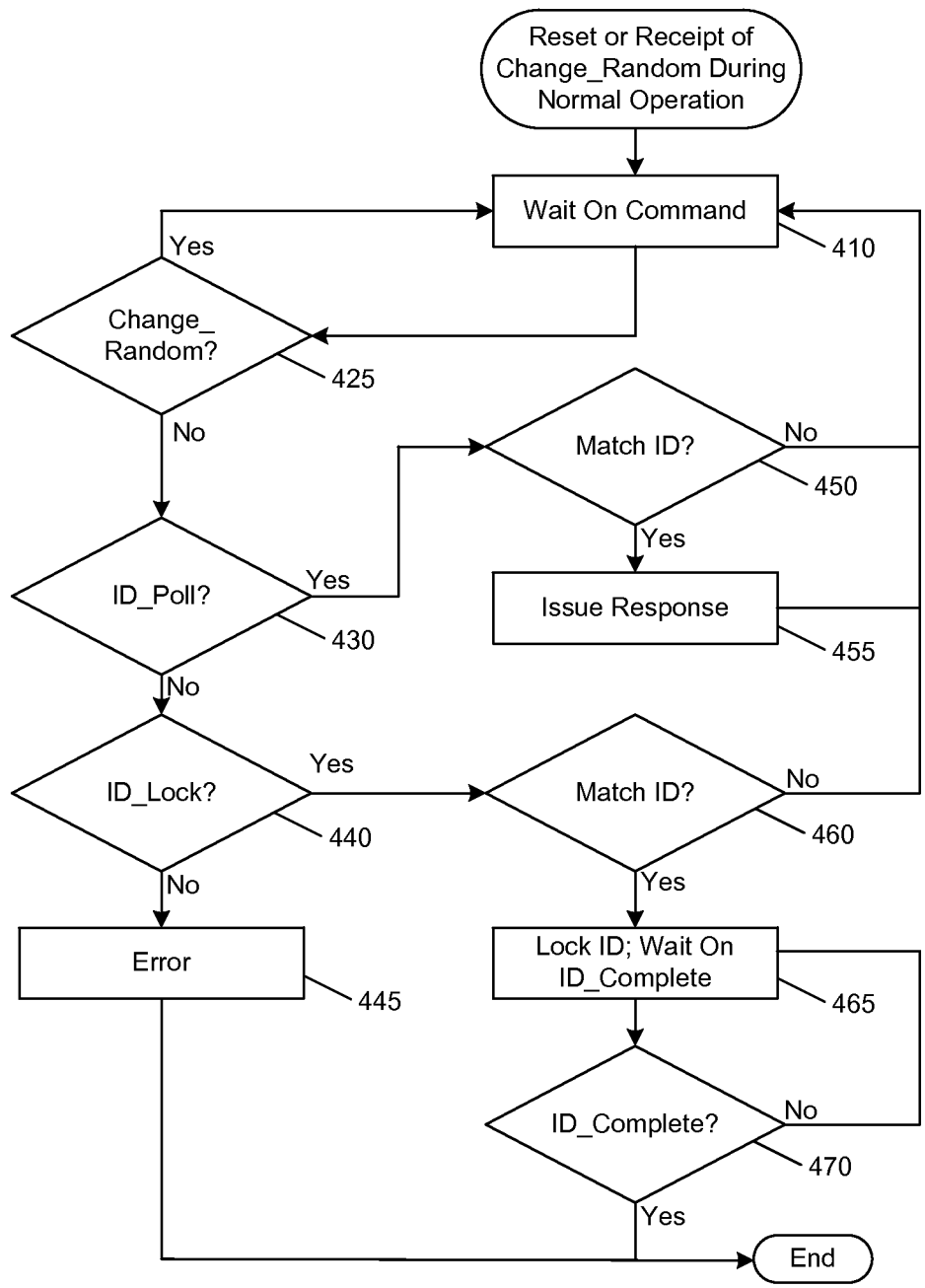
FIG. 7 is a flow diagram of a method for performing a device ID assignment from a view of a device having a pre-determined device ID in accordance with one embodiment of the present invention.

Embodiments thus can be used in many different environments. Referring now to FIG. 7, shown is a flow diagram of a method for performing a device ID assignment from a view of a device having a predetermined device ID. As seen, method 400 may begin at reset or receipt of a Change_Random command during normal operation (block 405). Control next passes to block 410 where the device waits on a command. If the received command is a Change_Random command, as determined at diamond 425, control passes back to wait at block 410. Otherwise, control passes to diamond 430 to determine whether it is an ID_Poll command. If so, control passes to diamond 450 to determine whether the address associated with this ID_Poll command matches the device ID (namely the pre-allocated device ID). If not, control returns to the wait state at block 410. If the addresses match, control passes to block 455 where the device may issue a response back a host controller. In this situation, the response may indicate, in a data portion of the reply the same response format for a device with an unallocated address. Control then passes again to the wait state at block 310.

If the received message is instead an ID_Lock message, as determined at diamond 440, control passes to diamond 460 to determine whether the address associated with the ID_Lock request matches the pre-allocated ID. If so, control passes to block 465 where the device may lock its ID to this random ID value and then the device may wait for the address allocation process to complete via an ID_Complete command, which when received at diamond 470 causes the method to conclude. Note that if an error occurs, control passes to block 445 where the method may be completed. Although shown at this high level in the embodiment of FIG. 7, understand the scope of the present invention is not limited in this regard.

Figure 8:
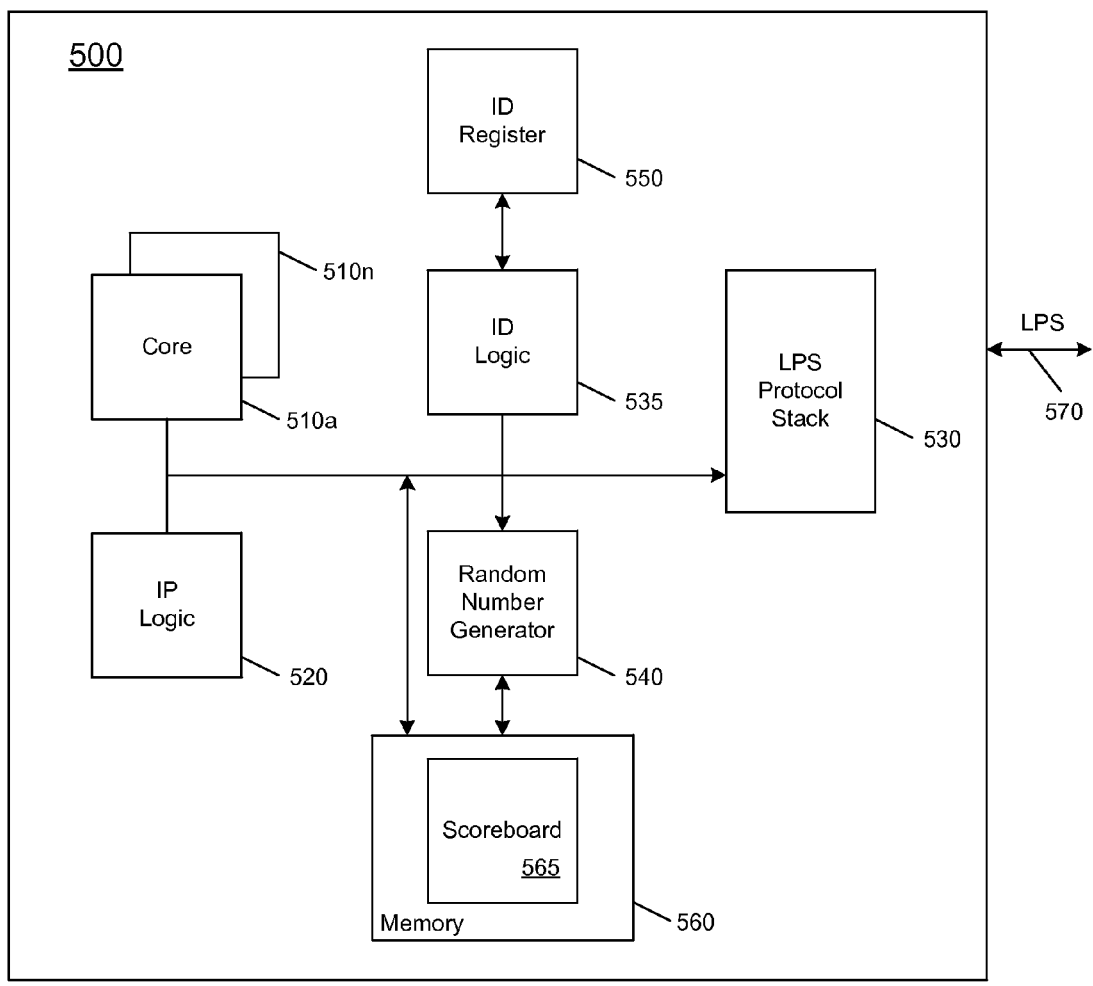
FIG. 8 is a block diagram of a device configured to perform address allocation in accordance with one embodiment of the present invention.

Referring now to FIG. 8, shown is a block diagram of a device configured to perform address allocation as described herein. As seen, device 500 may be an integrated circuit (IC) that includes various logic. In different implementations, this device may be an inbox device such as a peripheral device coupled to a SoC, or may be an external device coupled to a system via an external port.

In the embodiment shown, device 500 may include a plurality of cores $510_a$-$510_n$, which can be heterogeneous or homogeneous cores. Of course while multiple cores are shown, understand that in other implementations a single core may be present. And still further it is possible that a device may include no cores and instead have one or more other logic blocks. In addition, an intellectual property (IP) logic 520 may be present and can be used to perform specialized operations, e.g., one or more functions that can be offloaded to it by one or more of the cores.

For purposes of performing address allocation operations, an ID logic 535 may be present and can be coupled to an LPS protocol stack 530, which may generally include the same layered architecture as the host controller of FIG. 3. Note that while this implementation is with specific reference to a device coupled to an LPS interconnect 570, understand that embodiments apply equally to other serial interconnect-based schemes.

ID logic 535 may be coupled to an ID register 550 which may store a device ID that in turn can be generated by ID logic 535 responsive to commands received from a host controller and using a mapping to a random number, which can be generated by a random number generator 540. In some implementations, note that a dedicated random number generator may not be present, and this functionality can be implemented, e.g., within one or more of the cores, IP logic, or ID logic.

As further seen, device 500 may further include a memory 560 such as a cache memory or so forth. This memory may include a scoreboard 565, which can include a plurality of entries that each stores a valid device identifier, each stored responsive to a command from a host controller to lock a given device ID. In this way, random number generator 540 can generate random numbers that do not conflict with already allocated device IDs that are present in scoreboard 565. Although shown at this high level in the embodiment of FIG. 8, understand the scope of the present invention is not limited in this regard.

Figure 9:
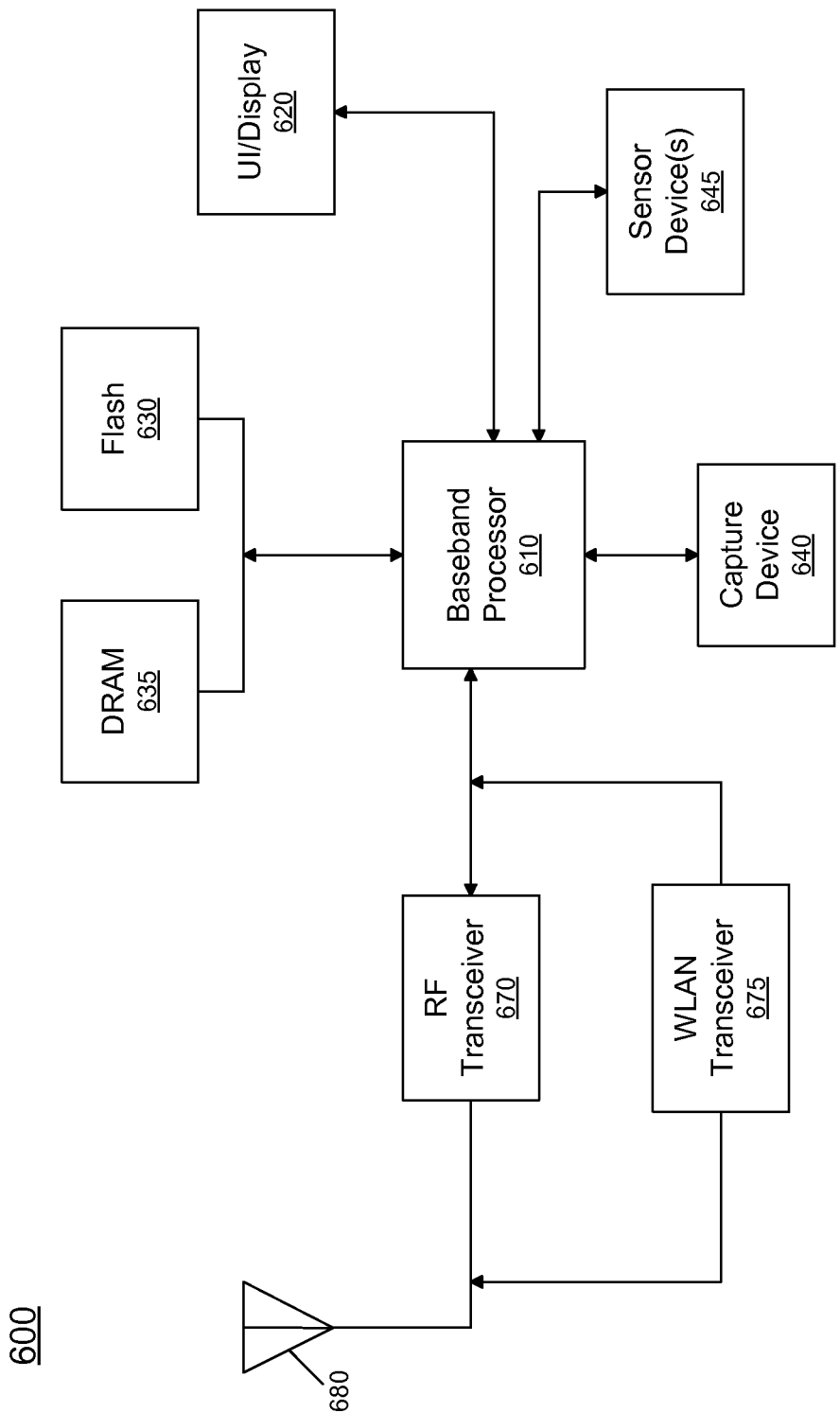
FIG. 9 is a block diagram of an example system with which embodiments can be used.

Embodiments thus can be used in many different environments. Referring now to FIG. 9, shown is a block diagram of an example system 600 with which embodiments can be used. As seen, system 600 may be a smartphone or other wireless communicator. As shown in the block diagram of FIG. 9, system 600 may include a baseband processor 610 which may be a multicore processor that can handle both baseband processing tasks as well as application processing. Thus baseband processor 610 can perform various signal processing with regard to communications, as well as perform computing operations for the device. In turn, baseband processor 610 can couple to a user interface/display 620 which can be realized, in some embodiments by a touch screen display. In addition, baseband processor 610 may couple to a memory system including, in the embodiment of FIG. 9 a non-volatile memory, namely a flash memory 630 and a system memory, namely a dynamic random access memory (DRAM) 635. As further seen, baseband processor 610 can further couple to a capture device 640 such as an image capture device that can record video and/or still images. Baseband processor 610 can further couple to one or more sensor devices 645, e.g., via an LPS interconnect as described herein.

To enable communications to be transmitted and received, various circuitry may be coupled between baseband processor 610 and an antenna 680. Specifically, a radio frequency (RF) transceiver 670 and a wireless local area network (WLAN) transceiver 675 may be present. In general, RF transceiver 670 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 675, local wireless signals, such as according to a Bluetooth™ standard or an IEEE 802.11 standard such as IEEE 802.11a/b/g/n can also be realized. Note that the link between baseband processor 610 and one or both of transceivers 670 and 675 may be via a low power converged interconnect that combines and maps functionality of a PCIe™ interconnect and a low power interconnect such as a MIPI interconnect. Although shown at this high level in the embodiment of FIG. 9, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an integrated circuit having:
an intellectual property (IP) logic configured to perform operations responsive to instructions;
a random number generator configured to generate a random number responsive to a first command from a host controller coupled to the apparatus via an interconnect, wherein the apparatus is coupled to the interconnect via open drain signaling in an enumeration phase; and
an identification logic configured to generate a device identifier for the apparatus, wherein the apparatus is configured to provide a reply to the host controller including the random number and a complement of the random number responsive to an identification request from the host controller corresponding to the device identifier, the apparatus further configured to store the device identifier in an identification storage of the apparatus responsive to an identification lock request from the host controller corresponding to the device identifier and regenerate the random number to obtain a device identifier not present in a scoreboard of the apparatus responsive to receipt of a change request from the host controller.

2. The apparatus of claim 1, wherein the apparatus is configured to further store the device identifier in the scoreboard responsive to the identification lock request.

3. The apparatus of claim 2, wherein the apparatus is configured to power down the random number generator responsive to the identification lock request from the host controller corresponding to the device identifier.

4. The apparatus of claim 1, when the apparatus is configured to not regenerate the random number if the change request is received after the identification lock request from the host controller corresponding to the device identifier.

5. The apparatus of claim 1, wherein the apparatus is coupled to the interconnect via non-open drain signaling in an operational phase.

6. The apparatus of claim 1, wherein the apparatus comprises a semiconductor device provided by a vendor without a pre-established device identifier.

7. A method comprising:
issuing, from a host controller, a first command to a plurality of devices coupled to a multi-drop interconnect to request a reply from at least one of the plurality of devices having a device identifier of a first value, the reply including a random number and a complement of the random number;
determining if a valid reply is received from one of the plurality of devices and if so, storing the device identifier of the first value in a storage of the host controller;
otherwise issuing a second command to cause at least some of the plurality of devices to regenerate the device identifier having a different value, wherein each of the plurality of devices is coupled to the multi-drop interconnect via open drain signaling in an enumeration phase; and
if the valid reply is received from one the plurality of devices, issuing a third command to cause the device identifier of the first value to be locked by the one of the plurality of devices, wherein at least one of the plurality of devices that is unlocked is to generate a new device identifier responsive to the second command.

8. The method of claim 7, further comprising iterating issuing the first command, determining if the valid reply is received, and issuing the second command until a device identifier is allocated to each of the plurality of devices.

9. The method of claim 8, further comprising thereafter issuing an identification completion command to indicate that the device identifier assignment is completed.

10. The method of claim 7, further comprising issuing the second command responsive to receipt of an invalid reply from one or more of the plurality of devices.

11. The method of claim 10, wherein the invalid reply is due to at least two of the plurality of devices communicating a reply having a common device identifier and a different random number.

12. The method of claim 10, further comprising determining that an invalid reply is received responsive to a mismatch between a message portion of the invalid reply corresponding to the random number and an error detection portion of the invalid reply corresponding to the complement of the random number.

13. A system comprising:
a host controller coupled to an interconnect;
a first device coupled to the interconnect; and
a second device coupled to the interconnect, wherein the second device is configured to receive a poll command from the host controller and to return a random number and a complement of the random number if an identifier of the poll command corresponds to a device identifier of the second device, store the device identifier in an identification storage if a lock command is received from the host controller corresponding to the device identifier, regenerate the random number if a change command is received from the host controller before the lock command, and regenerate a new device identifier with a value not present in a scoreboard based on the regenerated random number, wherein the first device and the second device are each coupled to the interconnect via open drain signaling in an enumeration phase.

14. The system of claim 13, wherein the second device is configured to power down a random number generator of the second device responsive to receipt of the lock command from the host controller corresponding to the device identifier.

* * * * *